Oct. 9, 1962  R. W. FRITTS  3,057,340
THERMOELECTRICALLY POWERED HEATING SYSTEM
Filed Oct. 9, 1959  3 Sheets-Sheet 1

INVENTOR.
ROBERT W. FRITTS
BY
Carpenter Abbott Coulter & Kinney
ATTORNEYS

Oct. 9, 1962   R. W. FRITTS   3,057,340
THERMOELECTRICALLY POWERED HEATING SYSTEM
Filed Oct. 9, 1959   3 Sheets-Sheet 2

INVENTOR.
ROBERT W. FRITTS
BY
Carpenter, Abbott, Coulter & Kinney
ATTORNEYS

Oct. 9, 1962 R. W. FRITTS 3,057,340
THERMOELECTRICALLY POWERED HEATING SYSTEM
Filed Oct. 9. 1959 3 Sheets-Sheet 3

INVENTOR.
ROBERT W. FRITTS
BY
Carpenter Abbott Coulter & Kinney
ATTORNEYS

United States Patent Office 3,057,340
Patented Oct. 9, 1962

3,057,340
THERMOELECTRICALLY POWERED HEATING SYSTEM
Robert W. Fritts, Arden Hills, Minn., assignor to Minnesota Mining and Manufacturing Company, St. Paul, Minn., a corporation of Delaware
Filed Oct. 9, 1959, Ser. No. 845,373
7 Claims. (Cl. 126—101)

This invention relates to improvement in heating systems. In conventional house heating systems, whether of the forced air or water circulating type, it is standard practice to provide means for circulating a fluid medium, viz. air or water, between the heat source and the space or spaces to be heated. This circulating means conventionally takes the form of a fan or pump driven by a constant speed, line powered electric motor under the control of relatively complex thermostatic switching apparatus.

Of the features of these conventional systems which are not entirely satisfactory, one such feature is that regardless of the rate at which heat is generated at the main burner, whether it be low, medium or high, or any intermediate value, the medium is circulated at the one constant rate, with the result that the heat generated is not most efficiently used.

Moreover, in spite of the fact that the development of controls for gas fired heating equipment has progressed to the point where control systems are commercially available which afford thermostatic and even modulating control of the gaseous fuel without reliance upon power from an electric utility, the use of medium circulating means has usually required resort to line power for energization of the driving motor therefor.

With the above in mind, it is a general object of the present invention to provide an improved heating system having modulating heat source and having a modulating rate fluid medium circulating means which is operable to circulate a fluid heat transfer medium at a rate modulted in accordance with the rate at which the heat source is modulated.

Another object of the invention is to provide an improved heating system of the class described in which the operation of the medium circulating means is independent of any electrical utility.

Still another object of the invention is to provide an improved heating system of the aforementioned character in which modulation of the rate of medium circulation is also effected in response to changes in temperature of, for example, the ambient atmosphere outside the house or other structure being heated.

A more specific object of the invention is to provide an improved heating system as aforedescribed in which the modulating drive of and control for the medium circulating means is effected without the use of any control instrumentality involving circuit interrupting means or the like.

Another specific object of the invention is to provide an improved heating system in which the medium circulating means is powered by electrical energy from a thermoelectric generator having hot junction means exposed to the burning fuel at the main burner of a furnace, said generator also having cold thermojunction means, and there being means for transferring heat from said cold thermojunction means to the circulated fluid medium.

Other and further objects and advantages of the invention will become apparent as the description proceeds reference being had to the drawings accompanying and forming a part of this specification and in which.

Figure 1:
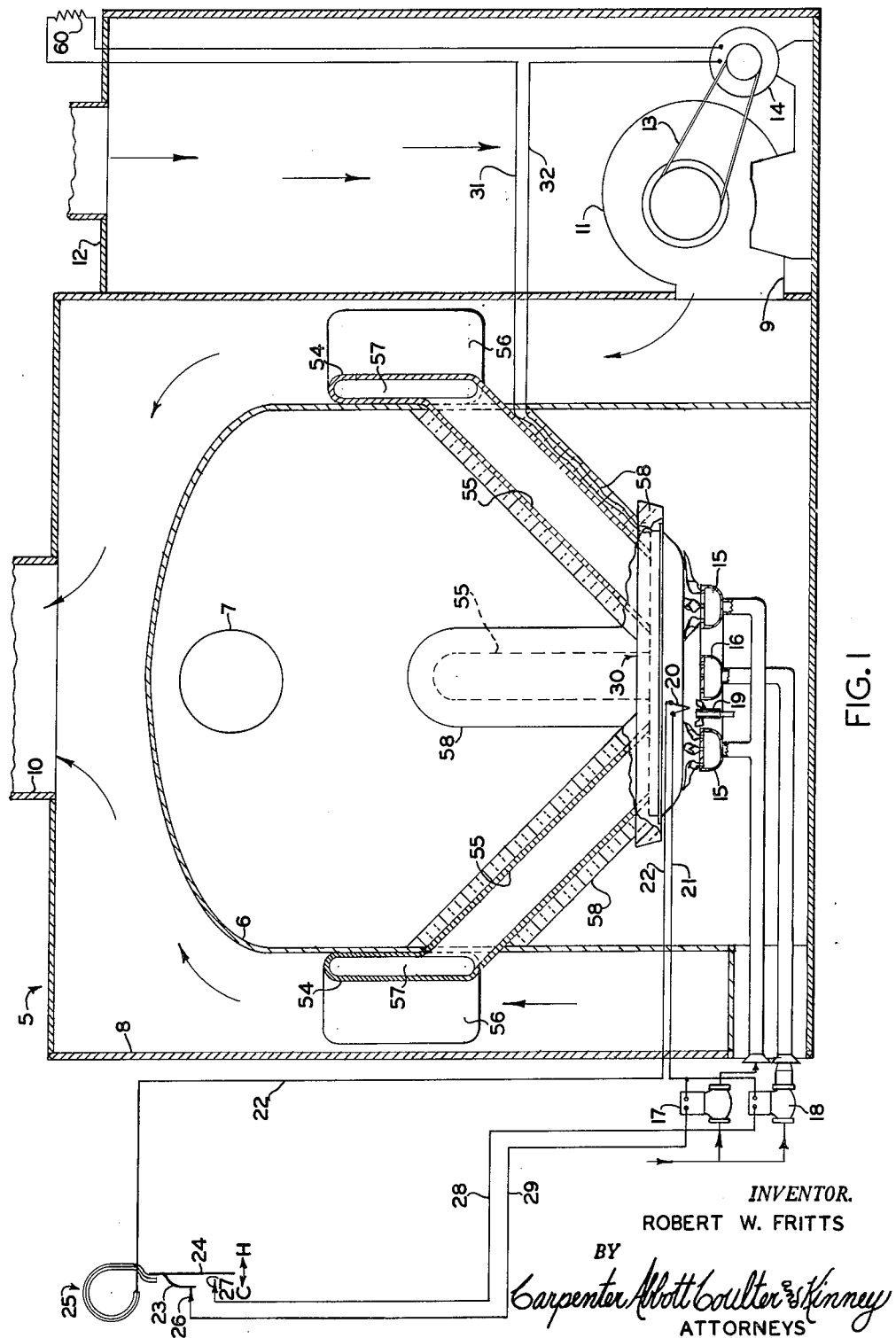
FIGURE 1 is a fragmentary semi-diagrammatic vertical sectional view of a gaseous fuel burning forced air heating system constructed in accordance with the principles of the invention.

Referring more particularly to FIGURE 1 of the drawing, the numeral 5 indicates a furnace of the forced air type provided wtih a casing 6 defining a combustion chamber provided with a flue 7. A casing 8 surrounds the casing 6 in spaced relation and is provided with a cold air inlet 9 and a warm air outlet 10. The warm air outlet 10 communicates with a duct work system (not shown) through which warm air is supplied to warm air registers (also not shown) in the space or spaces to be heated. Medium circulating means 11 in the form of a fan has its outlet connected to the inlet 9 and is disposed within a casing 12 forming part of a cold air return system including duct work and connected cold air registers (not shown) in the space or spaces to be heated. The fan 11 is driven, for example through a belt 13, by a motor 14 of the modulating type, the speed of which is variable in accordance with the magnitude of the electrical energization supplied thereto.

Disposed within the combustion chamber defined by casing 6 is a heat source which is preferably of the modulating type and which in the illustrated form of the invention is gaseous fuel burning means comprising burners 15 and 16. The burners 15 are supplied with gaseous fuel through an electroresponsive valve 17, and the burner 16 is supplied with gaseous fuel through an electroresponsive valve 18, the inlet to each of said valves being connected to a suitable source of gaseous fuel (not shown). A pilot burner 19 is disposed in igniting relation with the burners 15 and 16 and is also connected with the aforementioned source of gaseous fuel. A thermoelectric generator shown schematically at 20 is positioned with its hot thermojunction subject to the heat of burning fuel at the pilot burner 19, and one terminal of said generator is connected by a conductor 21 to one terminal of each of the valves 17 and 18. The other terminal of the generator 20 is connecetd by a conductor 22 to the movable contacts 23 and 24 of a two-stage thermostat shown diagrammatically at 25 and which is preferably mounted in a room to be heated by heat from the furnace 5.

The thermostat 25 is provided with fixed contacts 26 and 27 cooperating with the movable contacts 23 and 24 as shown, said fixed contacts being connected to the valves 17 and 18 respectively by conductors 28 and 29. The generator 20 affords sufficient electrical energization for opening of one or both of valves 17 or 18 under the control of the thermostat 25. With the contact 23 of the thermostat closed on the contact 26, the valve 17 is held open by energizing current from the generator 20, and fuel is supplied to and burns at the burners 15. If the temperature at the thermostat rises above an upper predetermined control point, contact 23 disengages from the contact 26 to de-energize and close the valve 17 for shutoff of all main burner fuel. If, on the other hand, the temperature at the thermostat drops below a lower predetermined control point, the contact 24 is moved into engagement with the contact 27 to effect simultaneous energization of the valves 17 and 18 by current from the generator 20, so that gaseous fuel burns at the burner 16 as well as at the burners 15. The heat source comprising the burners 15 and 16 and the attendant control system therefore thus affords modulation of the heat generated in accordance with variations in the temperature of the space being heated and independent by any electrical utility.

Means is provided to afford modulation of the rate at which the heat transfer medium, i.e. air in FIGURE 1, is circulated between the heat source and the space being heated in accordance with modulation of the heat source output and independent of any line power. To this end a thermoelectric generator assembly indicated generally by the numeral 30 is disposed within the combustion chamber in a position to be subject to the heat of burning fuel at the burners 15 and 16. The generator assembly 30 is connected in circuit with the terminals of the motor 14, as by conductors 31 and 32.

Figure 3:
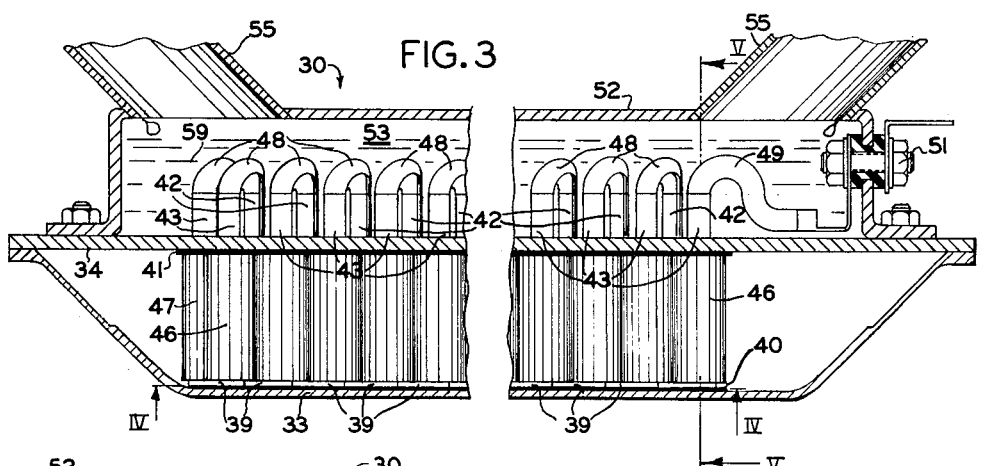
FIGURE 3 is an enlarged fragmentary vertical sectional view of the thermoelectric generator and coolant enclosure assembly of the invention.
Figure 5:
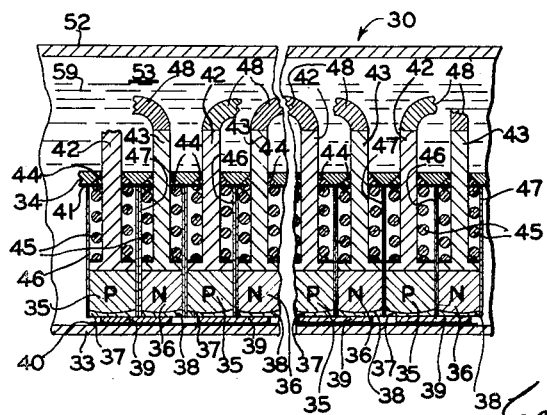
FIGURE 5 is a fragmentary vertical sectional view taken approximately along the lines V—V of FIGURES 3 and 4.

Referring more particularly to FIGURES 3 and 5, the assembly 30 comprises a pan-shaped member 33, for example of stainless steel, sealingly joined to a perforated cover plate 34 to form an hermetically sealed enclosure for a plurality of P-type and N-type thermoelectric elements 35 and 36 connected in series circuit relation as will appear. The thermoelectric elements 35 and 36 are preferably cylindrical and are preferably formed with convex lower end walls complemental to concave upper surfaces of hot junction electrode disks 37 and 38. Adjacent hot junction electrode disks 37 and 38 are connected, as by welding, by straps 39 of metal having good electrical and thermal conductivity characteristics. A thin layer 40 of heat conductive electrical insulation is interposed between the connector straps 39 and the member 33 as shown in FIGURES 3 and 5.

The positive thermoelectric elements 35 and the negative thermoelectric elements 36 may be formed of the positive and negative materials, respectively, disclosed in Robert W. Fritts and Sebastian Karrer Patent No. 2,811,571. The hot junction contact electrode disks 37 and 38, as well as the cold junction electrodes 42 and 43 may be made of the materials disclosed in Russell E. Fredrick, Robert W. Fritts and William V. Huck Patent No. 2,811,569, for example iron.

An electrically insulating sheet 41 overlays the underside of the perforated plate 34 and is identically perforated. The upper ends of the thermoelements 35 and 36 are electrically joined to cold junction electrodes 42 and 43 respectively, each having a cylindrical head portion, preferably bonded to the adjacent upper end wall of the associated thermoelement, and each having a stem portion projecting through registering perforations in the sheet 41 and plate 34 as shown in FIGURES 3 and 5. As shown in FIGURE 5 the underside of the plate 34 is countersunk at each of the perforations therein to receive a resilient rubber-like O-ring seal 44. An O-ring seal 44 surrounds the stem portion of each of the cold junction electrodes 42 and 43 as shown. Also surrounding the stem portions of the cold junction electrodes 42 and 43 and interposed between the head portions of said electrodes and the insulating sheet 41 are helical compression springs 45. The compression springs 45 function to place the thermoelectric elements 35 and 36 under compression to afford the same shock resistance while maintaining a good pressure contact of said thermoelements with the associated hot junction contact electrode disks. At the same time the springs 45, acting in the opposite direction through the insulating sheet 41 compress the O-rings 44 around each of the cold junction electrode stems to form a seal.

Coaxially surrounding each of the thermoelectric elements 35 and 36 and its associated hot junction electrode disk and cold junction electrode head portion in snug fitting relation, and also extending in surrounding relation with respect to the springs 45, are electrically insulating sleeves 46 and 47, for example of mica. The sleeves 46 and 47 maintain the subassembly surrounded thereby in coaxial alignment and prevent short circuiting between adjacent thermoelement assemblies. The sleeves 46 and 47 also afford substantial impedance to the flow of gaseous sublimation products in the event of overheating of the thermoelectric elements 35 and 36. The sealed enclosure formed by pan member 33 and cover member 34 may be evacuated, or it may contain a reducing type gaseous fill tending to prevent the formation of oxide films on the interface of the pressure contacts at the hot thermojunctions.

Figure 4:
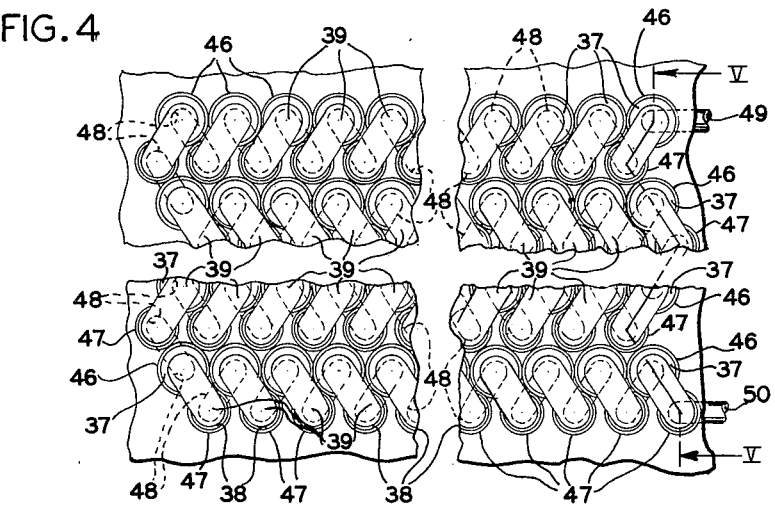
FIGURE 4 is a fragmentary bottom plan view of the thermoelectric generator taken along the lines IV—IV of FIGURE 3.

The stem portions of adjacent cold junction electrodes 42 and 43 are connected in series circuit relation above the plate 34 by U-shaped metallic conductors 48 of good electrical and thermal conductivity suitably joined thereto as by welding or soldering. The cold junction electrode stem portions comprising the ends of the series circuit through the generator 30 thus provided are connected by conductors 49 and 50 (FIGURE 4) to suitable terminals, only one of which, the terminal 51 in FIGURE 3, is shown, said terminals being, in turn, connected to the conductors 31 and 32 shown in FIGURE 1.

The assembly 30 is mounted with the pan member 33 disposed closely adjacent and above the burners 15 and 16 in a position to be wiped by the flames of said burners. The member 33, in addition to functioning as a heat absorbing member also functions as an efficient flame spreader. The hot thermojunctions of the thermoelements 35 and 36 are supplied with heat by conductive transfer through the pan member 33, straps 39 and hot junction electrode disks 37 and 38. In order to maintain a substantial temperature differential between the hot and the cold thermojunctions of the thermoelements 35 and 36, means is provided for cooling the cold thermojunctions by conduction of heat therefrom through the cold junction electrodes.

The cooling means referred to comprises an inverted pan shaped casing member 52 sealingly connected to the perforated plate 34 and forming therewith a chamber 53 enclosing the stem portions of the cold junction electrodes 42 and 43 projecting above the plate 34 and connected by the conductors 48. In the form of the invention illustrated in FIGURES 1 and 3 to 5, the chamber 53 forms a boiler chamber portion of an enclosure comprising a toroidal member or jacket 54 disposed within the space between the casings 6 and 8 and having communication with the chamber 53 through inclined radial conduits 55. The member 54 defines a condenser chamber 57 and is formed of material of good thermal conductivity, said member being provided with cooling fins 56. The casing member 52 and the conduits 55 are provided with thermal insulation 58 to minimize absorption of heat therethrough from the combustion chamber. Within the boiler chamber 53 the cold junction electrode stems and conductors 48 are immersed in a vaporizable liquid coolant 59 which is electrically non-conductive and which has a boiling temperature corresponding to that at which the cold junction electrode stems are to be maintained. Water, an inert fluorocarbon liquid such as the perfluorocyclicether disclosed in Patent No. 2,644,823, or any other suitable evaporative liquid may be used as the aforementioned coolant.

In the operation of the device the temperature of the cold junction electrode stems is maintained substantially at the boiling point of the coolant 59, the absorption of heat by said coolant from the contact electrode stems effecting vaporization of the coolant, the vapor rising in the conduits 55 and condensing within the condenser chamber 57 on contact with the cool inner surfaces of the member 54. The heat of vaporization absorbed from the cold junction electrode stems is thus transferred to the casing 54 and fins 56, from which it is transferred to the fresh air circulated therepast and in contact therewith by the fan 11. The condensed vapor returns to the boiler chamber 53 by gravity via the conduits 55.

The improved heating system also comprehends the provision of means for modulating the rate at which the heat transfer medium, i.e. fresh air, is circulated in accordance with variations in the ambient temperature outside the house heated by the furnace 5. In the embodiment of the invention illustrated in FIGURE 1, the last-mentioned means takes the form of a resistor 60 having a high positive temperature coefficient of resistance, said resistor being interposed in the conductor 31 for series circuit connection with the motor 14 and generator 30. The resistor 60 is located outside the house or other building heated by the furnace 5 and is responsive to a drop in the outside temperature to reduce the resistance in the circuit to the motor 14, thereby increasing the amount of electrical energy supplied to said motor and correspondingly increasing the speed thereof and the rate at which the fresh air is circulated by the fan 11. Conversely, the resistor 60 is responsive to an increase in outside temperature to increase the resistance of the motor circuit and thereby correspondingly reduce the rate at which the fresh air is circulated by the fan 11. Response of the resistor 60 to the outside ambient temperatures thus modulates the rate of circulation of the fresh air medium in accordance with variations in the outside ambient temperature without the use of any switching means or complicated controls utilizing circuit interruption means.

It is also within the concept of the invention to utilize a resistor 60 having a high negative temperature coefficient of resistance. When a resistor of this type is used, it is connected across the conductors 31 and 32 in parallel circuit with the motor 14, rather than in series circuit therewith as shown in FIGURE 1.

Figure 2:
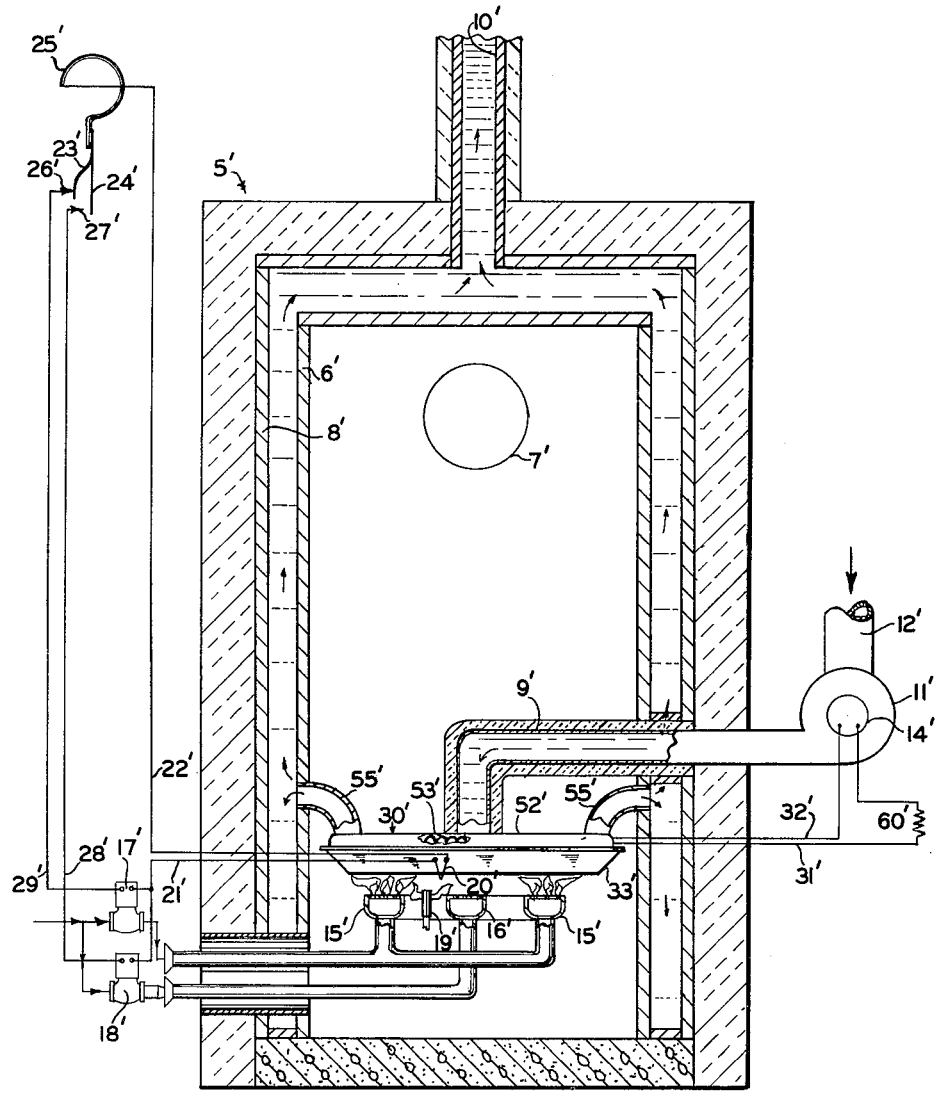
FIGURE 2 is a fragmentary semi-diagrammatic vertical section view of a gas burning circulating liquid heating system constructed in accordance with the principles of the invention.

FIGURE 2 illustrates the invention embodied in a heating system of the liquid circulating type, for example a domestic hot water heating system. The parts indicated in FIGURE 2 by primed reference characters, correspond to similar parts in FIGURE 1 indicated by the same reference characters unprimed.

In FIGURE 2 a casing 6′ defines a combustion chamber, and a casing 8′ defines therewith a water jacket surrounding the combustion chamber as shown. The burners 15′ and 16′ and the attendant thermostatic modulating fuel control system may be the same as that shown in the form of the invention illustrated in FIGURE 1. A hot water conduit 10′ extends from the upper end of the casing 8′ and communicates with a supply system (not shown) for heat radiating means in the space or spaces to be heated. A cool water return system (not shown) communicates between the heat radiating means aforementioned and the inlet 12′ of a circulating pump 11′. The outlet of the pump 11′ communicates with a conduit 9′ opening centrally through the upper casing member 52′ of the generator assembly 30′. Conduits 55′ open through peripheral portions of the upper casing member 52′ and afford communication with the water jacket through the casing 6′ as shown. The system, including the chamber 53′ of the assembly 30′ is completely filled with a liquid electrically non-conductive heat transfer medium, for example water, and as indicated by the arrows, operation of the pump 11′ circulates the cool water from the return system through the chamber 53 and out the conduits 55 to the water jacket. The liquid medium in passing through the chamber 53′ absorbs heat from the cold junction electrodes of the generator assembly 30′ and functions as a colant therefor to maintain a substantial differential between the hot and cold thermojunctions of the generator 30′ which, except as otherwise shown, may be identical with the generator 30.

The pump 11′ is driven by a motor 14′ of the modulating type, the speed of which varies in accordance with variations in electrical energization supplied thereto. Thus, as in the form of the invention illustrated in FIGURE 1, the rate at which the medium is circuated by the pump 11′ is modulated in accordance with modulation of the heat output heat source as well as in accordance with variations in outside ambient temperature as sensed by the resistor 60′.

In both forms of the invention illustrated, the coolant in contact with the cold junction electrode stems has sufficient thermal inertia so that when the heat source is turned from off to an on condition, relatively high temperature differentials are quickly established so that sufficient electrical energy is supplied to the motor to overcome its inertia and render the same operative even at lower hot junction temperatures. As the hot junction temperatures increase and the temperature differentials correspondingly increase, the power supplied to the motor increases and the rate of circulation of the medium gradually increases accordingly from a relatively slow to a faster rate. A sudden rush of air or water in the circulating system and the accompanying noise observed in conventional systems is thus avoided.

The improved heating system achieves automatic modulation of the circulating heat transfer medium in response to both modulation of the heat source and variations in outside ambient temperature, thereby automatically adjusting to favorable efficiency conditions for the overall system. Moreover, this operation is provided independent of line power and without the use of complicated and expensive switching means. Operation of the fan or pump in the present invention is accomplished without imposing any additional load on the conventional heat source utilized therein. The operating costs of the heating system are thus reduced by the elimination of need for externally powering the medium circulating means and the control system for the heat source.

Having thus described two illustrative embodiments of the structure and organization of the invention, it is to be understood that the illustrated forms were selected to facilitate the disclosure of the invention rather than to limit the number of forms which it may assume. Various modifications, adaptations and alterations may be applied to the specific forms shown to meet the requirements of practice, without in any manner departing from the spirit or scope of the invention, and all of such modifications, adaptations and alterations are contemplated as may come within the scope of the appended claims.

What is claimed as the invention is:

1. Heating apparatus comprising heat conductive means defining a combustion chamber, burner means within said combustion chamber, a jacket surrounding said combustion chamber, electro-responsive means for circulating a fluid heat transfer medium through said jacket and to a space to be heated, a thermoelectric generator disposed wholly within said combustion chamber, circuit means for energizing said circulating means by the electrical output of said thermoelectric generator, said generator comprising an enclosure having a heat conductive first wall adjacent and subject to the heat of burning fuel at said burner means, a plurality of thermoelements within said enclosure having hot thermojunction means adjacent and in heat conductive relation with said first enclosure wall, said enclosure having a second wall opposite said first wall and facing away from said burner means, said thermoelements being provided with cold thermojunction means projecting through said second wall, and a casing affording with said second wall a chamber into which said cold thermojunction means projects, and a liquid heat transfer medium within said last-mentioned chamber and in contact with said cold thermojunction means, said casing including conduit means communicating with said last-mentioned chamber and extending to said surrounding jacket affording, with said last-mentioned medium and said medium in said jacket, transfer of heat from said cold thermojunction means to the space to be heated, said cold thermojunction means being thereby maintained at a temperature not substantially higher than the boiling temperature of the liquid medium in contact therewith.

2. Apparatus for heating a given space comprising a heat source, electroresponsive means for circulating a first heat transfer medium to and from said space, a thermoelectric generator having thermoelements and having hot and cold thermojunction means disposed with said hot thermojunction means positioned to receive a portion of the heat output of said heat source, circuit means connecting said generator to said medium circulating means for energization of the latter by the electrical output of the generator, hermetically sealed enclosure means having a first sealed enclosure portion within which said thermoelements are wholly enclosed and having a second portion forming a vaporizing chamber into which said cold thermojunction means projects, said enclosure means also having a heat conductive portion forming a condenser chamber in communication with said vaporizing chamber remote from said heat source and in heat transfer relation with said medium, and a vaporizable second medium within said enclosure means and in heat transfer relation with said cold thermojunction means, said enclosure means being shaped to permit gravity return flow from said condenser chamber to said vaporizing chamber of condensate formed by condensation of vapors of said second medium in said condenser portion, said cold thermojunction means being thereby maintained at a temperature not substantially greater than the boiling temperature of said second medium, said second medium being operable to transfer heat from said cold thermojunction means to said first medium for delivery to said space.

3. Heating apparatus comprising means defining a combustion chamber, burner means within said combustion chamber, a jacket surrounding said combustion chamber, electroresponsive means for circulating a fluid heat transfer medium through said jacket and to a space to be heated, a thermoelectric generator disposed wholly within said combustion chamber, circuit means for energizing said circulating means by the electrical output of said thermoelectric generator, said generator comprising an enclosure having a heat conductive first wall adjacent and subject to the heat of burning fuel at said burner means, a plurality of thermoelements within said enclosure having hot thermojunction means adjacent and in heat conductive relation with said first enclosure wall, said enclosure having a second wall opposite said first wall and facing away from said burner means, said thermoelements being provided with cold thermojunction means projecting through said second wall, and a casing having a portion affording with said second wall a vaporizing chamber into which said cold thermojunction means projects, said casing also having a heat conductive portion forming a condenser chamber disposed within said surrounding jacket in heat transfer relation with said circulated medium therein and connected to said vaporizing chamber by conduit means and a vaporizable liquid heat transfer medium within said vaporizing chamber and in contact with said cold thermojunction means, said media affording transfer of heat from said cold thermojunction means to the space to be heated, said cold thermojunction means being thereby maintained at a temperature not substantially higher than the boiling temperature of the liquid medium in contact therewith.

4. Heating apparatus comprising means defining a combustion chamber, burner means within said combustion chamber, a jacket surrounding said combustion chamber, electroresponsive means for circulating a liquid heat transfer medium through said jacket and to a space to be heated, a thermoelectric generator disposed wholly within said combustion chamber, circuit means for energizing said circulating means by the electrical output of said thermoelectric generator, said generator comprising an enclosure having a heat conductive first wall adjacent and subject to the heat of burning fuel at said burner means, a plurality of thermoelements within said enclosure having hot thermojunction means adjacent and in heat conductive relation with said first enclosure wall, said enclosure having a second wall opposite said first wall and facing away from said burner means, said thermoelements being provided with cold thermojunction means projecting through said second wall, and a casing affording with said second wall a chamber into which said cold thermojunction means projects, said casing including conduit means communicating with said last-mentioned chamber and with said surrounding jacket affording circulation of said liquid medium in said jacket and through said chamber and in contact with said cold thermojunction means for transfer of heat from said cold thermojunction means to the space to be heated, said cold thermojunction means being thereby maintained at a temperature not substantially higher than the boiling temperature of said liquid medium.

5. Heating apparatus comprising heat conductive means defining a combustion chamber, burner means within said combustion chamber, a jacket surrounding said combustion chamber, electroresponsive means for circulating a fluid heat transfer medium through said jacket and to a space to be heated, a thermoelectric generator, circuit means for energizing said circulating means by the electrical output of said thermoelectric generator, said generator comprising an enclosure having a heat conductive first wall in said combustion chamber adjacent and subject to the heat of burning fuel at said burner means, a plurality of thermoelements within said enclosure having hot thermojunction means adjacent and in heat conductive relation with said first enclosure wall, said enclosure having a second wall on the opposite side of said first wall from said burner means, said thermoelements being provided with cold thermojunction means projecting through said second wall, and a casing affording with said second wall a chamber into which said cold thermojunction means projects, and a liquid heat transfer medium within said last-mentioned chamber and in contact with said cold thermojunction means, said casing including conduit means communicating with said last-mentioned chamber and extending to said surrounding jacket affording, with said last-mentioned medium and said medium in said jacket, transfer of heat from said cold thermojunction means to the space to be heated, said cold thermojunction means being thereby maintained at a temperature not substantially higher than the boiling temperature of the liquid medium in contact therewith.

6. Heating apparatus comprising means defining a combustion chamber, burner means within said combustion chamber, a jacket surrounding said combustion chamber, electroresponsive means for circulating a fluid heat transfer medium through said jacket and to a space to be heated, a thermoelectric generator, circuit means for energizing said circulating means by the electrical output of said thermoelectric generator, said generator comprising an enclosure having a heat conductive first wall in said combustion chamber adjacent and subject to the heat of burning fuel at said burner means, a plurality of thermoelements within said enclosure having hot thermojunction means adjacent and in heat conductive relation with said first enclosure wall, said enclosure having a second wall on the opposite side of said first wall from said burner means, said thermoelements being provided with cold thermojunction means projecting through said second wall, and a casing having a portion affording with said second wall a vaporizing chamber into which said cold thermojunction means projects, said casing also having a heat conductive portion forming a condenser chamber disposed within said surrounding jacket in heat transfer relation with said circulated medium therein and connected to said vaporizing chamber by conduit means and a vaporizable liquid heat transfer medium within said vaporizing chamber and in contact with said cold thermojunction means, said medium affording transfer of heat from said cold thermojunction means to the space to be heated, said cold thermojunction means being thereby maintained at a temperature not substantially higher than the boiling temperature of the liquid medium in contact therewith.

7. Heating apparatus comprising means defining a combustion chamber, burner means within said combustion chamber, a jacket surrounding said combustion chamber, electroresponsive means for circulating a liquid heat transfer medium through said jacket and to a space to be heated, a thermoelectric generator, circuit means for energizing said circulating means by the electrical output of said thermoelectric generator, said generator comprising an enclosure having a heat conductive first wall in said combustion chamber adjacent and subject to the heat of burning fuel at said burner means, a plurality of thermoelements within said enclosure having hot thermojunction means adjacent and in heat condutcive relation with said first enclosure wall, said enclosure having a second wall on the opposite side of said first wall from said burner means, said thermoelements being provided with cold thermojunction means projecting through said second wall, and a casing affording with said second wall a chamber into which said cold thermojunction means projects, said casing including conduit means communicating with said last-mentioned chamber and with said surrounding jacket affording circulation of said liquid medium in said jacket and through said chamber and in contact with said cold thermojunction means for transfer of heat from said cold thermojunction means to the space to be heated, said cold thermojunction means being thereby maintained at a temperature not substantially higher than the boiling temperature of said liquid medium.

References Cited in the file of this patent
UNITED STATES PATENTS

| | | |
|---|---|---|
| 2,015,610 | Underwood | Sept. 24, 1935 |
| 2,237,054 | Jensen | Apr. 1, 1941 |
| 2,244,831 | Drichta et al. | June 10, 1941 |
| 2,456,070 | Malek et al. | Dec. 14, 1948 |
| 2,501,627 | Findley | Mar. 21, 1950 |
| 2,519,241 | Findley | Aug. 15, 1950 |
| 2,547,933 | Fitz Gerald | Apr. 10, 1951 |
| 2,827,893 | Ribaudo et al. | Mar. 25, 1958 |
| 2,835,447 | Calahan | May 20, 1958 |